(12) United States Patent
Kirch (10) Patent No.: US 11,559,831 B2
(45) Date of Patent: Jan. 24, 2023

(54) EXTRUSION PRESS WITH ELECTRO-HYDROSTATIC CONTROL SYSTEM

(71) Applicant: Moog GmbH, Boblingen (DE)

(72) Inventor: Klaus Kirch, Aachen (DE)

(73) Assignee: Moog GmbH, Boblingen (DE)

( * ) Notice: Subject to any disclaimer, the term of this patent is extended or adjusted under 35 U.S.C. 154(b) by 134 days.

(21) Appl. No.: 16/973,844

(22) PCT Filed: Jun. 11, 2019

(86) PCT No.: PCT/EP2019/065187
§ 371 (c)(1),
(2) Date: Dec. 10, 2020

(87) PCT Pub. No.: WO2019/238663
PCT Pub. Date: Dec. 19, 2019

(65) Prior Publication Data
US 2021/0121927 A1    Apr. 29, 2021

(30) Foreign Application Priority Data
Jun. 11, 2018    (DE) .......................... 102018113910.1

(51) Int. Cl.
*B21C 23/21*    (2006.01)
*B21C 35/04*    (2006.01)
(Continued)

(52) U.S. Cl.
CPC ............ *B21C 23/211* (2013.01); *B21C 35/04* (2013.01); *B30B 1/32* (2013.01); *B30B 9/323* (2013.01);
(Continued)

(58) Field of Classification Search
CPC ....... B29C 47/004; B29C 43/44; B30B 11/22; B30B 11/221; B30B 11/224;
(Continued)

(56) References Cited

U.S. PATENT DOCUMENTS 3,675,451 A * 7/1972 Aisenberg ............. B30B 11/221
  72/271
5,845,516 A * 12/1998 Allen, Jr. ................ B30B 11/26
  62/384
(Continued)

FOREIGN PATENT DOCUMENTS

CN    103687679 A    3/2014
DE    3522685 A1 *    1/1987    ............... B26D 3/20
(Continued)

*Primary Examiner* — Adam J Eiseman
*Assistant Examiner* — Matthew Stephens
(74) *Attorney, Agent, or Firm* — Harter Secrest & Emery LLP (57) ABSTRACT

The present invention relates to an extrusion press (10, 20, 30) with a press cylinder (111), the press cylinder (111) being driven with an electro-hydrostatic control system (104) for a power transmission and being connected to a separate drive (120, 400) for rapid traverse, with a container (115), wherein the container (115) is connected to a hydraulic cylinder (117) for a power transmission and to a further separate drive (119, 300) for rapid traverse, with a hydraulic cylinder (101) with a locking device (103) for driving a shearing tool (102), wherein the hydraulic cylinder (101) is connected to the electro-hydrostatic control system (104), and wherein the press cylinder (111) in the power transmission and the hydraulic cylinder (101) for driving a shearing tool (102) are controlled alternately via the common electro-hydrostatic control system (104).

19 Claims, 3 Drawing Sheets

(51) Int. Cl.
  *B30B 1/32*     (2006.01)
  *B30B 15/16*    (2006.01)
  *B30B 9/32*     (2006.01)
  *B29C 48/00*    (2019.01)
  *B29C 48/05*    (2019.01)
  *B29C 48/06*    (2019.01)

(52) U.S. Cl.
  CPC ........ *B30B 15/166* (2013.01); *B29C 48/0011* (2019.02); *B29C 48/05* (2019.02); *B29C 48/06* (2019.02)

(58) Field of Classification Search
  CPC ..... B30B 11/227; B30B 11/26; B30B 11/265; B30B 11/30; B30B 1/32; B30B 9/3025; B30B 9/3057; B30B 9/3089; B30B 9/323; B21C 23/211; B21C 23/212; B21C 35/04
  See application file for complete search history.

(56) References Cited

U.S. PATENT DOCUMENTS

| | | |
|---|---|---|
| 2010/0212521 A1 | 8/2010 | Resch et al. |
| 2014/0096581 A1* | 4/2014 | Yakushigawa ........ B30B 11/221 |
| | | 72/271 |
| 2015/0056315 A1 | 2/2015 | Pannewtiz et al. |

FOREIGN PATENT DOCUMENTS

| | | | |
|---|---|---|---|
| DE | 4022148 A1 | 1/1992 | |
| DE | 102009043034 A1 | 3/2011 | |
| DE | 102011116964 A1 | 5/2012 | |
| GB | 338946 A * | 11/1930 | ............... B26D 3/20 |
| WO | 2011079333 A2 | 7/2011 | |
| WO | 2018019622 A1 | 2/2018 | |

* cited by examiner

EXTRUSION PRESS WITH ELECTRO-HYDROSTATIC CONTROL SYSTEM

The present invention relates to an extrusion press having an electro-hydrostatic control system.

Extrusion presses are known in the state of the art. Extrusion presses produce a continuous profile with high forces of about 10 MN to 150 MN by pressing a blank through a die. The main movements of extrusion presses are the movement of the press cylinder in the rapid traverse and in the power mode, of the shear tool, such as a scissor for the clean removal of the press residue, as well as the movement of the container in the rapid traverse and the pressing of the container for sealing the press chamber to the outside, so that no material can escape. In addition, there are various auxiliary functions, such as a tool change, the tool clamping, the press scraper, which perform a movement on the extrusion press.

A disadvantage of the state of the art extrusion presses is that, in particular, the movements of the press cylinder and of the shearing tool require large volume flows, which must be provided with large pumping capacities. These large pump volume flows require large oil containers with large oil volumes, for example in the range of 10,000 l-20,000 l, with which the hydraulic system of the extrusion press is supplied. According to the state of the art, the factor for the required oil volume may also be at least 3 to 5 times the maximum total pump delivery capacity.

Another disadvantage is that during rapid traverse of the press cylinder, which takes place via auxiliary cylinders or via electromechanical drive systems, an even greater volume flow must be conveyed via a so-called filling or circulation valve. In addition, when compressing and decompressing, even larger volume flows are required for a short time compared to the installed pump delivery rate. Due to these conditions, the oil volume to be kept in reserve in the tank must be available up to a factor of approx. 5 to 10 times in relation to the installed pump delivery rate.

In the extrusion presses known as state of the art, this large oil volume is installed at a height of 2 to 3 meters above the extrusion press, for example, because of the required rapid suction and the more favorable suction of the pumps.

In particular, further developments of the extrusion press, which are intended to avoid the disadvantages of the large oil volume and the arrangement of the oil container at a correspondingly necessary height above the extrusion press, are based on the approach of reducing the air present in the oil, as dissolved or undissolved air.

With the degassed oil, which is intended to reduce the cavitation for the suction of the pumps, during decompression and when the oil is circulated via the suction valve in the rapid traverses, the oil volume with the degassed oil in the oil container can be reduced.

The disadvantage of the method is that the degassing of the oil volume is technically complex, causes high costs and, in the event of a fault or failure of the degassing, leads to failure and destruction of the hydraulic components.

The improvements achieved with degassing the oil compared to extrusion presses without degassed oil, such as, for example, less critical suction of the pumps, less critical decompression and less critical circulation of the oil via the suction valve, lead to additional disadvantages.

An extrusion press using degassed oil requires complex piping from the oil tank to the pumps, from the pumps to the main functions in the extrusion press and, in addition, an expensive tank line is required through which the oil is pumped back into the oil reservoir. The dimensioning of the tank lines for the required volume flows must be based on the current criteria, which means that the tank lines must be designed accordingly large. These large and correspondingly expensive lines usually have to be adapted to the installation situation of the machine on site. A corresponding adaptation of the piping requires a great deal of planning, project planning and production and is therefore associated with high costs.

In addition, the problem arises that the length of the lines used is limited, since long lines are problematic in dynamic processes, such as extrusion, and should be avoided.

In addition to the disadvantages mentioned above, known state of the art extrusion presses have the disadvantage that a large amount of space is required for the installation of the hydraulic unit and the piping, as well as environmental protection measures to be installed on the hydraulic unit. An installation of the supply unit in a separate hydraulic room or hydraulic cellar is correspondingly technically more complex and causes additional and increased costs.

Starting with this state of the art, the object of the present invention is to at least partially overcome the disadvantages of the state of the art, or to improve the state of the art.

The object is achieved by an extruder according to claim 1 of the present invention. Preferred embodiments and modifications are the subject matter of the subclaims.

An extrusion press according to the invention has a press cylinder, the press cylinder being driven with an electro-hydrostatic control system for a power mode and being connected to a separate drive for a rapid traverse.

In one embodiment, the press cylinder comprises a piston chamber, a piston and a piston rod, the piston chamber for the power mode being connected to the electro-hydrostatic control system and the piston for the rapid traverse being connected to the separate drive.

The extruder also has a hydraulic cylinder with a locking device for driving a shearing tool, the hydraulic cylinder being connected to the electro-hydrostatic control system. The locking device holds the drive of the shear tool in the non-actuated position. The locking device thus prevents the heavy shearing tool from dropping unintentionally, for example due to a loss of pressure. The locking device can in particular be implemented as a blocking valve or as a combination of blocking valves in a circuit.

The movement of the press cylinder and the drive of the shear tool can be provided by hydraulic cylinders with synchronous functionality. Synchronous cylinders, however, have the disadvantage that they require a large amount of space for their movement. In order to compensate for this disadvantage, especially in facilities with little space, a combination of differential cylinders with the same areas is used in particular, which generate a function of the same area corresponding to the synchronous cylinders.

A differential cylinder is understood to mean a hydraulic cylinder in which the cylinder surfaces differ on the front and rear sides of the piston. The side with the smaller cylinder surface is referred to as the rod side because a piston rod is arranged on this side. The cylindrical surface on the rod side is called an annular surface. The side with the larger cylinder area of a differential cylinder is the so-called piston side. Either no piston rod, or a piston rod having a smaller diameter than on the rod side, is arranged on the piston side. The cylinder surface on the piston side is called the piston surface. The functionality of a synchronous cylinder, whereby the piston rod moves out on one side depending on the position of the cylinder, and thus an increased space requirement is given, can be achieved by the combination of 2 or more differential cylinders.

The extrusion press also has a container, the container being connected to a hydraulic cylinder for a power transmission and to a further separate drive for the rapid traverse.

The container in an extruder should in particular be designed to perform a rapid traverse (rapid traverse) in order to feed in new material and to close the extruder again. The supply of new material represents an unproductive time in the production process, since in particular no material is processed during this time, but costs for the operation of the extrusion press still arise. Due to the rapid traverse, the opening and closing movements are as fast as possible, which means that downtimes of the extrusion press can be reduced. After closing, the container must be pressed onto the tool with a high level of pressure. The pressing force required for pressing is provided in particular via a hydraulic cylinder, since electromechanical drive systems in particular cannot apply the necessary pressing force. The disadvantage here is that in the case of hydraulic cylinders which provide the high pressing forces, large quantities of oil must be made available in a large volume flow to achieve the movement for rapid traverses of the hydraulic cylinder. A combination of a hydraulic cylinder and an electromechanical drive system is used so that the hydraulic system can also be designed to be as small as possible in rapid traverse. Advantageously, the container is driven by the electromechanical drive system during rapid traverse and the oil is conveyed by the circulation of the hydraulic cylinder. During the pressing process, the container is supplied via a hydraulic system, with no oil flow taking place, only pressure being built up and maintained for pressing.

The extrusion press is characterized in that the press cylinder in the power mode and the hydraulic cylinder for driving a shearing tool are controlled alternately via the common electro-hydrostatic control system (Electro hydrostatic actuation system—EAS).

In the context of the present invention, the EAS includes at least one compact drive (Electro Hydrostatic Pump Unit—EPU) and a control block for controlling the compact drive. The compact drive has a servomotor and a pump. The EAS is supplied by means of a low-pressure supply, as a preload, with a pressure of 10 bar, for example, but with a low volume flow. The EPU are speed controllable. EPU are characterized by their compact design. The pump of the compact drive is positioned very close to the cylinder of the compact drive. If the movements of the press cylinder and the drive of the shear tool are consistently implemented by using the EAS with compact drives, there is a saving in the design of the hydraulic unit required for the supply. A hydraulic unit is required to supply the compact drives, but it can be designed to be smaller than is the case with conventional control of hydraulic cylinders. This leads to a reduction in the piping for supplying the individual components of the extrusion press and thus to a reduction in costs.

It is also within the meaning of the present invention if the electro-hydrostatic control system comprises further EPUs. The number of EPUs is to be selected according to the design and use of the extrusion press.

The press cylinder in the power transmission and the press cylinder for driving the shearing tool are advantageously driven via a common electro-hydrostatic control system. The actuation of the press cylinder and the drive for the shear tool takes place alternately. The extrusion press is advantageously designed in such a way that the shearing tool and the press cylinder have the same power requirement, which enables switching and thus only one electro-hydrostatic control system is required for two different functionalities within the extrusion press. With an appropriate design, both the press cylinder and the shear tool require the same order of magnitude in terms of volume flow and oil pressure.

Advantageously, different orders of magnitude of volume flow and oil pressure can also be provided by the electro-hydrostatic control system. In particular, the design of the volume flow and oil pressure is based on the maximum requirement of one of the components to be controlled. If, for example, the press cylinder has a higher demand for a volume flow and/or oil pressure, the electro-hydrostatic control system is designed according to the requirements of the press cylinder. This procedure is also used when the drive of the shearing tool has a higher demand for a volume flow and/or oil pressure. The volume flow and/or oil pressure is adapted or designed using the speed-adjustable EPU.

In a preferred embodiment, the separate drive of the rapid traverse of the press cylinder is an electromechanical drive. Furthermore, the separate drive for the rapid traverse of the container is another electromechanical drive.

Electromechanical drive systems are characterized by their compact design, low maintenance and total costs and optimized energy efficiency. They also provide the required rapid movement of the press cylinder and the container during rapid traverse. This has the advantage that no high volume flow is necessary for a rapid traverse of the hydraulic cylinder. The oil in the hydraulic cylinders of the press cylinder and the container is conveyed by the circulation in the hydraulic cylinder during rapid traverse.

In one embodiment, the press cylinder, the hydraulic cylinder of the container and the hydraulic cylinder for driving a shearing tool are designed as synchronous cylinders or from a combination of differential cylinders with collectively identical active surfaces.

In one embodiment, the electro-hydrostatic control system comprises at least one electro-hydrostatic pump unit. The electro-hydrostatic pump unit comprises a servomotor and a pump and is designed as a compact drive.

In one embodiment, the electro-hydrostatic pump unit is preloaded with a pressure between 5 bar to 15 bar, in particular 10 bar, via a low-pressure supply. The low-pressure supply provides the preload for the compact drives driven in the electro-hydrostatic control system as an internal supply, which is advantageously carried out via a low volume flow. The oil volume made available by the low-pressure supply can thus advantageously be reduced from several thousand liters, for example 10,000 l to 20,000 l, to several hundred liters for supplying the EPU units.

In one embodiment, the low-pressure supply comprises, in particular, a pump unit, an oil reservoir, a storage and a storage safety block.

In one embodiment, the extrusion press comprises an additional pressure storage and a hydraulic unit, the hydraulic unit providing pressure in the pressure storage and the pressure storage being connected to the press cylinder via a control block.

A large volume flow can advantageously be generated for a short time by the stored pressure in the pressure storage. For this purpose, a hydraulic unit, for example a small hydraulic pump, generates pressure in the pressure storage. The stored energy can in particular be used for rapid compression. compression is to be understood here as the connection of residual material with a newly inserted blank. If the compression takes place at a corresponding speed, the materials are compressed and a connection is established between the remaining material and the newly inserted blank. Since the process of compression does not produce a product, but rather the compression only represents an unavoidable intermediate production step, it is intended that this be carried out as quickly as possible. This requires a corresponding pressure and volume flow from the pressure storage. In this regard, the use of electromechanical drive systems is excluded, as these cannot generate the necessary force.

The rapid compression, if this is required in the extrusion press, can advantageously be provided to the press cylinder by the pressure storage with hydraulic unit via the control block, in addition to the volume flow provided by the electro-hydrostatic control system. The press cylinder is advantageously supplied in parallel via the control block by the pressure storage and by the compact drives of the electro-hydrostatic control system, whereby faster compression can be achieved than when using without the pressure storage and control block and thus process times and production costs are reduced.

In one embodiment, the pressure storage is connected to the hydraulic cylinder of the container via a control block. The pressure contained in the pressure storage can advantageously be provided via the control block as a pressing force for pressing the container onto the pressing tool. A high pressing force is required to press the container against the pressing tool. The pressing force can be provided by the pressure storage via the control block. By pressing on the container, the escape or flow of material from the press tool is prevented.

By using the pressure storage for rapid compression, there is advantageously the possibility of using the pressure storage accordingly for pressing the container, whereby an additional hydraulic system for driving the hydraulic cylinder of the container is no longer required and is thus saved.

In a particularly preferred embodiment, the rapid path of the container is connected to an electro-hydrostatic drive system.

In a further preferred embodiment, the rapid traverse of the press cylinder is connected to an electro-hydrostatic drive system.

The drives of the rapid traverse of the container and/or the rapid traverse of the press cylinder can advantageously be controlled by an electro-hydrostatic drive system. In this regard, the press cylinder and the container are no longer connected to electromechanical drive systems, such as servomotors via rack and gear, but rather via hydraulic cylinders that have a separate electro-hydrostatic control system with EPU and control block. Advantageously, the electro-hydrostatic drive system for the rapid traverse of the container and the rapid traverse of the press cylinder can also be supplied as a common preload via the low pressure supply of the electro-hydrostatic control system for the press cylinder and for the drive of the shear tool.

In one embodiment, the electro-hydrostatic drive system for the rapid traverse of the container and for the rapid traverse of the press cylinder comprises a hydraulic cylinder, an electro-hydrostatic control system and an electro-hydrostatic pump unit.

In one embodiment, the hydraulic cylinder is designed as a synchronous cylinder or from a combination of differential cylinders with collectively identical active areas.

In one embodiment, the hydraulic cylinder is controlled by the electro-hydrostatic control system.

In one embodiment, the electro-hydrostatic control system comprises at least one electro-hydrostatic pump unit.

In one embodiment, the electro-hydrostatic control system is connected via the control block to the hydraulic cylinder of the container, which is carried out alternately to the rapid traverse. Advantageously, by connecting the electro-hydrostatic control system to the hydraulic cylinder of the container, the container can be controlled, with which in particular the container can be pressed when the rapid traverse of the container is not performed.

In one embodiment, the electro-hydrostatic control system is connected to hydraulic auxiliary functions which are carried out alternately to the rapid traverse. Advantageously, if the rapid traverse of the press cylinder is not carried out, the electro-hydrostatic control system can in particular carry out secondary functions of the extrusion press such as, for example, tool displacements and tool clamping, or clamping devices can be controlled.

The advantageous use of electro-hydrostatic control systems over electromechanical drive systems results from the fact that the functions of the electromechanical drive systems are spatially bound by the fixed positioning and are therefore not suitable for switching the functionality to other components of the extrusion press. Electro-hydrostatic control systems enable hydraulic switching so that control capacities, if they are in use by functions of the extrusion press, can also be used for other functions within the extrusion press. The rapid traverses of the container and the press cylinder represent the main function. If, for example, the rapid traverses are not active, the electro-hydrostatic control system of the container and the press cylinder can be used to control auxiliary functions and/or support functions.

Auxiliary functions are in particular the pressing of the container and auxiliary functions include in particular a tool change, tool clamping or other functions.

Furthermore, the present invention relates to a method using the inventive extruder with the steps: Control (S1) the power transmission of a press cylinder via an electro-hydrostatic control system, control (S2) the power transmission of a container via a hydraulic cylinder, control (S3) the rapid traverse of the press cylinder via a separate drive. The separate drive can in particular be an electromechanical drive system or an electro-hydrostatic drive system. Further comprising the step of: Controlling (S4) the output of the container via a further separate drive. The further separate drive can in particular be an electromechanical drive system or an electro-hydrostatic drive system. Further comprising the step of: Controlling (S5) a hydraulic cylinder for driving a shearing tool via the electro-hydrostatic control system, whereby the step of controlling (S1) the power transmission of the press cylinder and controlling (S5) the hydraulic cylinder for driving a shearing tool via the common electro-hydrostatic control system takes place alternately.

Advantageously, the method using the inventive extrusion press, with the alternating control via the common electro-hydrostatic control system, allows the necessary oil volume to supply the common electro-hydrostatic control system of several thousand liters, for example 10,000 l to 20,000 l can be reduced to several hundred liters to supply the EPU units. Furthermore, the use of a low pressure supply reduces the piping required compared to the use of conventional hydraulic systems.

Furthermore, the present invention relates to the use of an extruder for the production of bars and/or wires and/or tubes and/or profiles, in particular seamlessly pressed. Advantageously, rods and/or wires and/or tubes and/or profiles can be produced from materials selected from a group comprising aluminum, aluminum alloys, copper, copper alloys, magnesium alloys, steel and other metals and alloys, in particular seamlessly, by the extrusion press.

The invention is explained in the following on the basis of various embodiments, whereby it is being pointed out that this example also includes modifications or additions as would be apparent to a skilled person. Moreover, this preferred embodiment is not a limitation of the invention, in that modifications and additions are within the scope of the present invention.

Here the following show.

Figure 1:
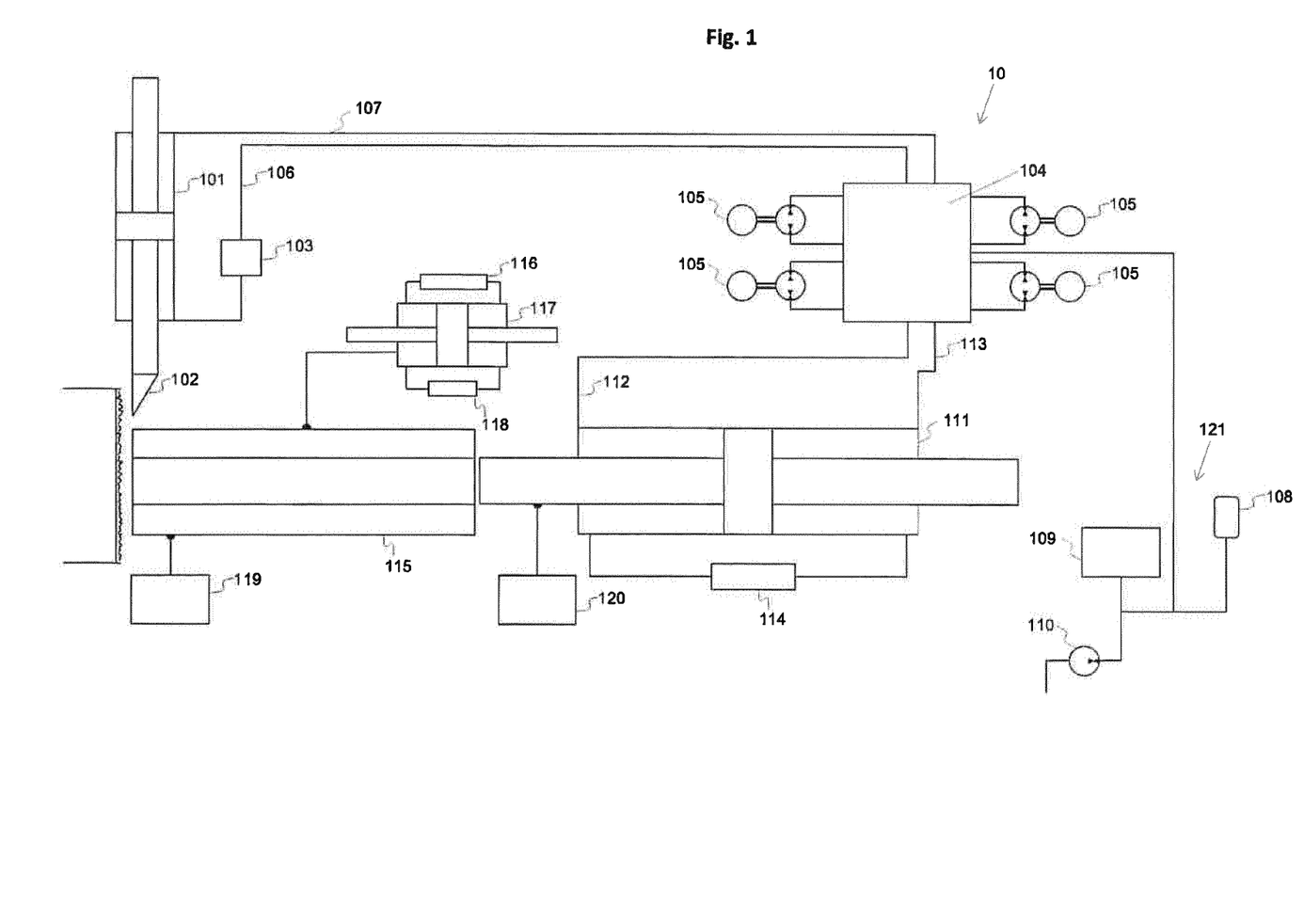
FIG. 1 is a schematic illustration of an extrusion press with an electro-hydrostatic drive system in accordance with a first embodiment.

FIG. 1 shows a schematic illustration of an extrusion press 10 with an electro-hydrostatic control system 104 in accordance with a first embodiment. The electro-hydrostatic control system 104 comprises at least one electro-hydrostatic pump unit 105. In particular, the electro-hydrostatic control system 104 comprises electro-hydrostatic pump units corresponding to the number of components of the extrusion press 10, 20, 30 to be supplied.

The electro-hydrostatic control system 104 is supplied via the low pressure supply 121. The low-pressure supply 121 comprises an oil reservoir 108, a storage safety block 109 and a pump unit 110. The low-pressure supply 121 provides the required preload, with a pressure between 5 bar to 15 bar, in particular 10 bar for the electro-hydrostatic pump units 105 driven in the electro-hydrostatic control system, as an internal supply, which advantageously takes place via a low volume flow.

Figure 2:
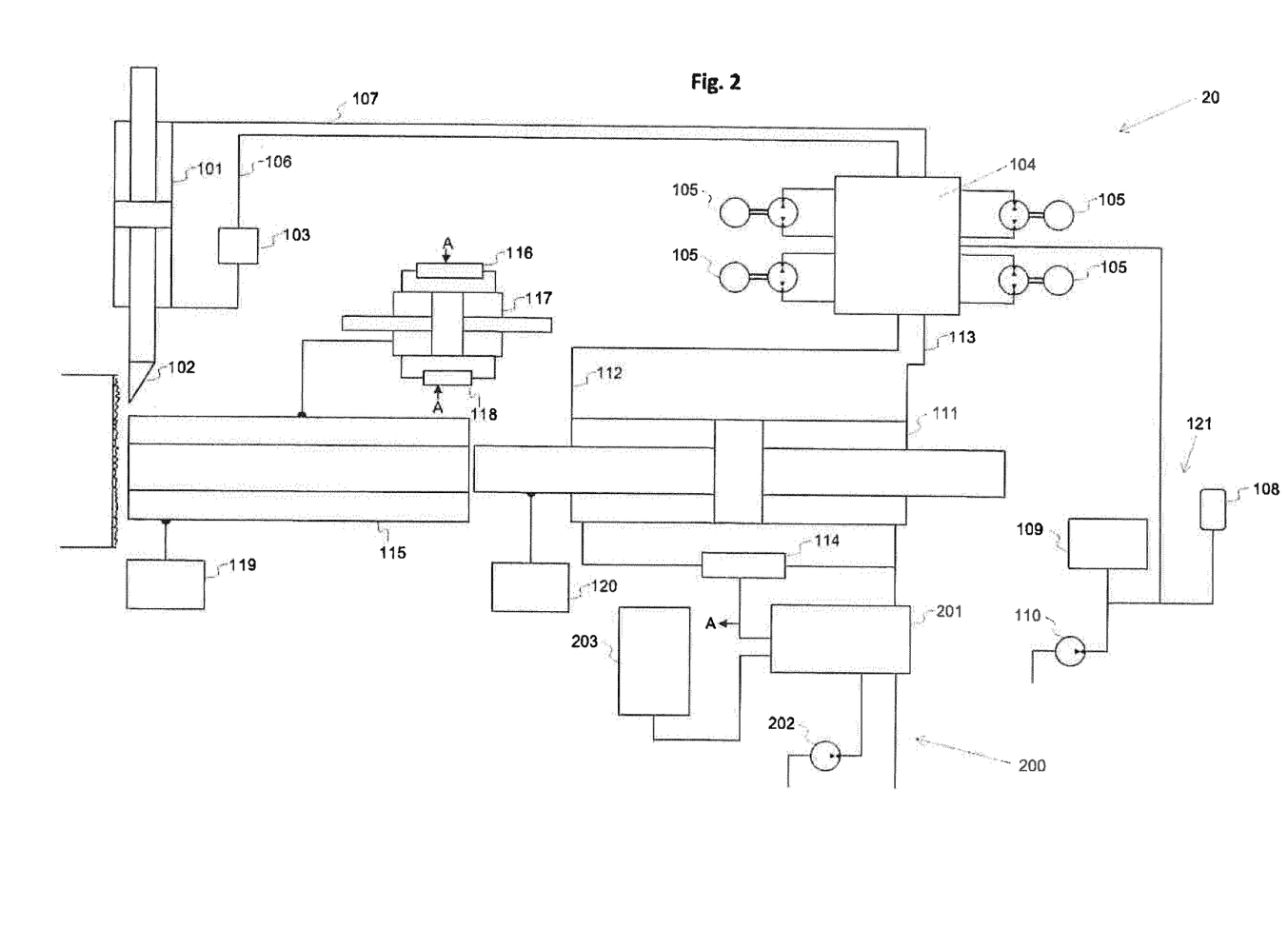
FIG. 2 is a schematic illustration of an extrusion press with an electro-hydrostatic drive system in accordance with a second embodiment.
Figure 3:
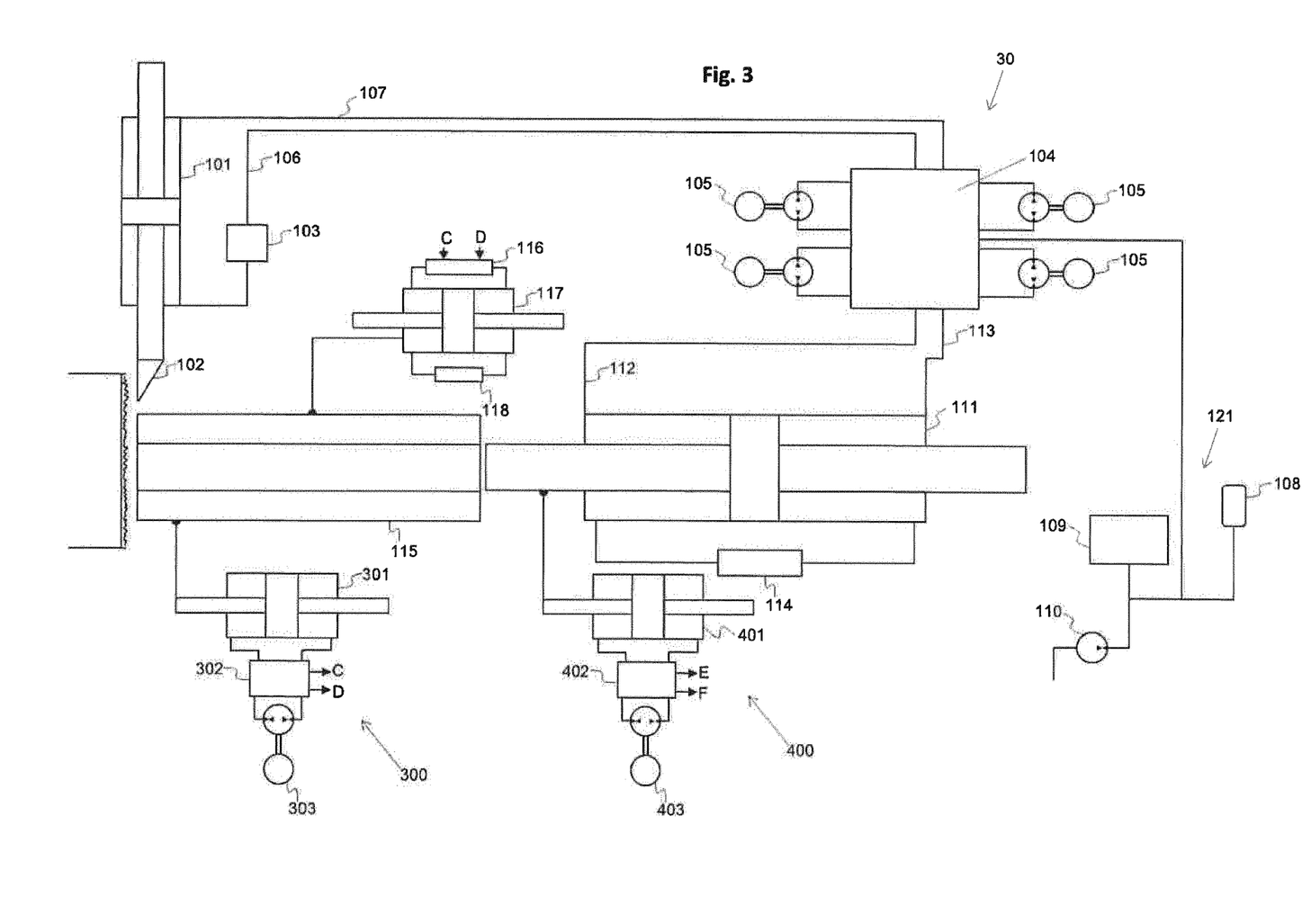
FIG. 3 is a schematic illustration of an extrusion press with an electro-hydrostatic drive system according to a third embodiment.

The extrusion press 10 with electro-hydrostatic control system 104 comprises a press cylinder 111. In FIGS. 1, 2 and 3, the press cylinder 111 is shown as a synchronous cylinder. In particular, the press cylinder 111 can also be designed as a differential cylinder with collectively identical areas. The press cylinder 111 is connected via the hydraulic lines 112, 113 to the electro-hydrostatic control system 104 for supplying the power transmission for the pressing. The rapid traverse of the press cylinder 111 is generated by the drive system 120. In particular, the drive system 120 can have an electromechanical drive system which is connected to the piston of the press cylinder 111 via a gear and linkage. During the rapid traverse, the oil in the press cylinder 111 is conveyed via the circuit 114.

The extrusion press 10 with an electro-hydrostatic control system 104 further comprises a container 115. The container 115 is connected to a hydraulic cylinder 117 with a control block 116 for pressing onto the workpiece. In FIGS. 1, 2 and 3, the hydraulic cylinder 117 is shown as a synchronous cylinder. In particular, the hydraulic cylinder 117 can also be designed as a differential cylinder with collectively identical areas. The hydraulic cylinder 117 is supplied with pressure via a hydraulic unit (not shown) for pressing the container 115 against the tool. The rapid traverse of the container 115 is generated by the drive system 119. In particular, the drive system 119 can have an electromechanical drive system. During the rapid traverse, the oil in the hydraulic cylinder 117 is conveyed via the circuit 118.

The extrusion press 10 with an electro-hydrostatic control system 104 further comprises a hydraulic cylinder 101 with a shear tool 102. In FIGS. 1, 2 and 3, the hydraulic cylinder 101 is shown as a synchronous cylinder. In particular, the hydraulic cylinder 101 can also be designed as a combination of differential cylinders with collectively identical areas. The hydraulic cylinder 101 is connected to the electro-hydrostatic control system 104 via the hydraulic lines 106, 107. The electro-hydrostatic control system 104 applies pressure to the cylinder 101 during the cutting process, so that the shearing tool 102 separates a remnant piece from the continuous profile. During the pressing process by the pressing cylinder 111, the hydraulic cylinder 101 with the shearing tool 102 is held in a non-actuated position. This is done by the locking device 103. The locking device 103 thus prevents unwanted lowering of the heavy shearing tool 102, for example due to a loss of pressure. The locking device 103 can be implemented as a blocking valve or as a combination of blocking valves connected in a circuit.

FIG. 2 shows a schematic illustration of an extrusion press 20 with an electro-hydrostatic control system 104 in accordance with a second embodiment. The basic function is the same as explained for FIG. 1. The same reference signs also designate the same elements as in FIG. 1. The embodiment shown in FIG. 2, however, has further components which are advantageous for certain application scenarios. For example, the extruder 20 with the electro-hydrostatic control system 104 comprises an external pressure storage system 200. The external pressure storage system 200 comprises a control block battery and compression 201, a pump unit 202 and a battery medium pressure 203. The pump unit 202 provides a pressure which is stored in the intermediate pressure storage 203. The medium pressure storage 203 can provide a pressure of 200 bar, for example. The medium pressure storage 203 and the pump unit 202 are connected to the battery and compression control block 201 and are controlled via this. The battery and compression control block are connected to the circulation 114 of the press cylinder.

In the case of extrusion presses with shortened cycle times, the compression and decompression function, which briefly require large volume flows, requires a larger hydraulic unit, including the pressure storage, to generate the hydraulic pressure, but this can be much smaller compared to extrusion presses without the electro-hydrostatic control system 104. By means of the external pressure storage system, a given volume flow can be generated briefly, whereby a faster compression than in the embodiment illustrated in FIG. 1 can be realized. The embodiment of the extrusion press 20 illustrated in FIG. 2 represents a variant of the embodiment of the extrusion press 10 illustrated in FIG. 1 in which the production step of compression is carried out more quickly by the additional pressure of the external pressure storage system 200 and thus the production time is shortened. The production step of compression can also take place in the embodiment of the extrusion press 10 shown in FIG. 1. However, this is slower since less volume flow is available for compression.

Furthermore, the external pressure storage system 200 can be connected via a connection A to the hydraulic cylinder 117 via the control block container 116 and the circuit 118. The connection A is made in particular by a hydraulic line. Advantageously, the pressing force contained in the medium pressure storage 203 can be provided via the battery and compression 201 control block, the pressing force necessary for pressing the container 115 onto the pressing tool. The pressing of the container 115 prevents material from escaping from the pressing tool.

Using the medium pressure storage 203 for quick compression advantageously results in the possibility of using the medium pressure storage 203 for pressing the container 115, so that a hydraulic system for driving the hydraulic cylinder 117 of the container 115 is no longer required and thus saved.

FIG. 3 shows a schematic illustration of an extrusion press 30 with an electro-hydrostatic control system 104 in a third embodiment. The basic function is the same as explained for FIG. 1. The same reference signs also designate the same elements as in FIG. 1. However, in contrast to FIG. 1, the embodiment shown in FIG. 3 has the electro-hydrostatic drive systems 300, 400, which replace the electromechanical drive systems 119, 120 of FIG. 1. The electro-hydrostatic drive systems 300, 400 are constructed identically and have a hydraulic cylinder 301, 401. The electro-hydrostatic drive system 300 is connected to the container 115 for the rapid traverse of the container 115, and the electro-hydrostatic drive system 400 is connected to the press cylinder 111 for the rapid traverse of the press cylinder 111. The hydraulic cylinders 301, 401 are shown as synchronous cylinders. In particular, the hydraulic cylinder 101 can also be designed as a combination of differential cylinders with collectively identical areas.

Furthermore, the electro-hydrostatic drive systems 300, 400 include an electro-hydrostatic control system 302, 402. The electro-hydrostatic control system 302 comprises the control block rapid traverse container 115 and can be connected in particular to the control block container 116 via the connection C and D. The electro-hydrostatic control system 402 comprises the control block rapid traverse press cylinder 111 and can be connected via the connection E and F in particular with auxiliary functions or secondary functions. The connections C, D, E and F are made in particular by a hydraulic line. The designation of the connections does not represent any restriction. In particular, the electro-hydrostatic control system 302 can also supply auxiliary functions or secondary functions and the electro-hydrostatic control system 402 can be connected to the container control block 116.

Furthermore, the electro-hydrostatic drive systems 300, 400 include an electro-hydrostatic pump unit 303, 403.

Supplying the rapid traverses of the extrusion press via the electro-hydrostatic drive systems 300, 400 has the advantage that when the rapid traverses are inactive, the functionality of the electro-hydrostatic drive systems 300, 400 can also be used for other functions by hydraulic switching. In the configuration with the electro-hydrostatic drive systems 300, 400, the advantage over the electromechanical drive systems results from the fact that the electromechanical drive systems are spatially fixed and cannot be used to switch over functionalities.

The electro-hydrostatic drive systems 300, 400 are also supplied in particular via the low pressure supply 121 present in the extrusion press 30 for controlling the electro-hydrostatic control system 104 (not shown). In this regard, the low-pressure supply 121 must be designed according to the components to be controlled. By jointly supplying the electro-hydrostatic control system 104 and the electro-hydrostatic drive systems 300, 400 via the low-pressure supply 121, the scope of the hydraulic supply is reduced both in terms of piping requirements and the size of the units and the oil reservoir, as well as in the required oil volume compared to conventional systems.

A further and alternative embodiment to FIG. 3 results from the combination of the cylinders 301 and 117 as a combination of several differential cylinders or a surface combination integrated in a cylinder housing, which in the sum of their surfaces each result in a cylinder of the same surface with surface switching for a rapid traverse and a force function. This cylinder combination or the special cylinder design is driven by a surface switchover to generate the rapid traverse and force movement of the container 115 with the electro-hydrostatic control system 302, 303 and/or 104.

A further and alternative embodiment to FIG. 3 results from the combination of the cylinders 401 and 111 as a combination of several differential cylinders or a surface combination integrated in a cylinder housing, which in the sum of their surfaces each result in a cylinder of the same surface with surface switching for a rapid traverse and a force function. This cylinder combination or the special cylinder design is driven by a surface switchover to generate the rapid traverse and force movement of the press cylinder 111 with the electro-hydrostatic control system 402, 403 and/or 104.

Furthermore, the external pressure storage system 200 used in the second embodiment of the extrusion press 20, for rapid compression, can also be integrated in the third embodiment of the extrusion press 30.

LIST OF REFERENCE SIGNS 10 extrusion press, main drive system
20 extrusion press, main drive system
30 extrusion press, main drive system
101 Hydraulic cylinder
102 Shearing tool
103 Locking device
104 Electro-hydrostatic control system
105 Electro-hydrostatic pump unit
106 Hydraulic line
107 Hydraulic line
108 Oil reservoir, storage
109 Storage security block
110 Pump unit
111 Press cylinder
112 Hydraulic line
113 Hydraulic line
114 Circulation of the press cylinder
115 Container
116 Control block for hydraulic cylinder container
117 Hydraulic cylinder container
118 Circulation of the hydraulic cylinder of the container
119 Electromechanical drive system
120 Electromechanical drive system
121 Low pressure supply, preload for EPUs
200 External pressure storage system
201 Control block battery and compression
202 Pump unit
203 Battery medium pressure
300 Electro-hydrostatic drive system container rapid traverse
301 Hydraulic cylinder container rapid traverse
302 Control block rapid traverse container
303 Electro-hydrostatic pump unit
400 Electro-hydrostatic drive system press cylinder rapid traverse
401 Hydraulic cylinder press cylinder rapid traverse
402 Control block rapid traverse press cylinder
403 Electro-hydrostatic pump unit
A Hydraulic connection
C, D Hydraulic connection
E, F Hydraulic connection

The invention claimed is:

1. An extrusion press comprising:
   a press cylinder, wherein the press cylinder is driven by an electro-hydrostatic control system for a first traverse and is connected to a separate first drive for a second traverse;
   a container, wherein the container is connected to a first hydraulic cylinder for a first traverse and is connected to a separate second drive for a second traverse;
   a second hydraulic cylinder, wherein the second hydraulic cylinder has a locking device, wherein the second hydraulic cylinder is configured to drive a shearing tool, and wherein the second hydraulic cylinder is connected to the electro-hydrostatic control system; and
   wherein the common electro-hydrostatic control system is operatively arranged to alternately control the press cylinder in the first traverse and the second hydraulic cylinder.

2. The extrusion press according to claim 1, wherein the separate first drive for the second traverse of the press cylinder is an electromechanical drive system.

3. The extrusion press according to claim 1, wherein the separate second drive for the second traverse of the container is an electromechanical drive system.

4. The extrusion press according to claim 1, wherein at least one of the press cylinder, the first hydraulic cylinder of the container, and the second hydraulic cylinder for driving the shear tool comprises a synchronous cylinder or a differential cylinders.

5. The extrusion press according to claim 1, wherein the electro-hydrostatic control system comprises at least one electro-hydrostatic pump unit.

6. The extrusion press according to claim 5, wherein a low-pressure supply is operatively arranged to provide a pressure to the electro-hydrostatic pump unit ranging from 5 bar to 15 bar.

7. The extrusion press according to claim 6, wherein the low-pressure supply comprises a second pump unit, an oil reservoir and a storage safety block.

8. The extrusion press according to claim 1, further comprising a pressure storage and a hydraulic unit, wherein the hydraulic unit is operatively arranged to provide a pressure in the pressure storage and the pressure storage is connected to the press cylinder via a control block.

9. The extrusion press according to claim 8, wherein the pressure storage is connected to the first hydraulic cylinder of the container via the control block.

10. The extrusion press according to claim 1, wherein the separate second drive for the second traverse of the container comprises an electro-hydrostatic drive system.

11. The extrusion press according to claim 1, wherein the separate first drive for the second traverse of the press cylinder comprises an electro-hydrostatic drive system.

12. The extrusion press according to claim 10, wherein the electro-hydrostatic drive system comprises a third hydraulic cylinder, a second electro-hydrostatic control system and an electro-hydrostatic pump unit.

13. The extrusion press according to claim 12, wherein the third hydraulic cylinder comprises a synchronous cylinder or at least one differential cylinder.

14. The extrusion press according to claim 11, wherein the separate second drive for the second traverse of the container comprises a second electro-hydrostatic drive system and the electro-hydrostatic drive system and the second electro-hydrostatic drive system each comprise hydraulic cylinders that are each controlled by an electro-hydrostatic control system.

15. The extrusion press according to claim 14, wherein each of the electro-hydrostatic control systems comprises at least one electro-hydrostatic pump unit.

16. The extrusion press according to claim 14, wherein at least one of the electro-hydrostatic control systems is connected to the first hydraulic cylinder via a control block and is operatively arranged to alternately execute the first traverse and the second traverse of the container.

17. The extrusion press according to claim 14, wherein at least one of the electro-hydrostatic control systems is operatively arranged to carry out hydraulic auxiliary functions alternately to the second traverse of the press cylinder.

18. A method of using the extrusion press according to claim 1, comprising the following steps:
    initiating the first traverse of the press cylinder via the electro-hydrostatic control system;
    initiating the first traverse of the container via the first hydraulic cylinder;
    initiating the second traverse of the press cylinder via the separate first drive;
    initiating the second traverse of the container via the separate second drive;
    driving a shearing tool via the second hydraulic cylinder and the electro-hydrostatic control system; and,
    using the electro-hydrostatic control system, actuating the first traverse of the press cylinder alternately with actuating the second hydraulic cylinder for driving the shear tool.

19. The method according to claim 18, further comprising the step of:
    producing, using the extrusion press, an extrusion in the form of a rod, wire, tube, or profile.

* * * * *